(12) United States Patent
Schabel et al.

(10) Patent No.: US 10,034,176 B2
(45) Date of Patent: Jul. 24, 2018

(54) EXTENDING A WIRELESS COVERAGE AREA IN AN UNLICENSED FREQUENCY BAND OF A SMALL CELL USING REMOTE RADIO HEADS

(71) Applicants: Alcatel-Lucent USA Inc., Murray Hill, NJ (US); Alcatel-Lucent India Limited, Gurgaon (IN)

(72) Inventors: Michael Schabel, Allen, TX (US); Subramanian Vasudevan, Morristown, NJ (US); Mohammad R. Khawer, Lake Hopatcong, NJ (US); Satish Kanugovi, Bangalore (IN)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 237 days.

(21) Appl. No.: 15/056,167

(22) Filed: Feb. 29, 2016

(65) Prior Publication Data

US 2017/0251380 A1 Aug. 31, 2017

(51) Int. Cl.
*H04W 24/00* (2009.01)
*H04W 16/14* (2009.01)
*H04W 24/10* (2009.01)

(52) U.S. Cl.
CPC .......... *H04W 16/14* (2013.01); *H04W 24/10* (2013.01)

(58) Field of Classification Search
CPC . H04W 16/26; H04W 72/0453; H04W 16/14; H04W 24/10
See application file for complete search history.

(56) References Cited

U.S. PATENT DOCUMENTS

| | | | | |
|---|---|---|---|---|
| 2002/0063373 A1* | 5/2002 | Sanders | ................. | B65H 31/00 |
| | | | | 270/58.08 |
| 2003/0210674 A1* | 11/2003 | Honkasalo | .............. | H04W 8/26 |
| | | | | 370/338 |
| 2012/0115498 A1* | 5/2012 | Kim | ..................... | H04W 52/244 |
| | | | | 455/452.2 |
| 2014/0307552 A1* | 10/2014 | Elsherif | ................ | H04W 36/14 |
| | | | | 370/235 |
| 2015/0139097 A1* | 5/2015 | Kronander | ............ | H04W 76/02 |
| | | | | 370/329 |
| 2015/0327044 A1* | 11/2015 | Shah | ...................... | H04W 8/005 |
| | | | | 455/434 |
| 2016/0095129 A1* | 3/2016 | Hoyhtya | ................ | H04W 16/14 |
| | | | | 370/330 |
| 2016/0198395 A1* | 7/2016 | Hou | ...................... | H04W 48/16 |
| | | | | 455/434 |
| 2016/0302226 A1* | 10/2016 | Kim | .................. | H04W 72/1289 |
| 2017/0150382 A1* | 5/2017 | Martin | .................. | H04W 24/08 |
| 2017/0238249 A1* | 8/2017 | Yoon | ................. | H04W 52/0206 |
| | | | | 370/311 |

* cited by examiner

*Primary Examiner* — Andrew Lee
(74) *Attorney, Agent, or Firm* — Davidson Sheehan LLP (57) ABSTRACT

A controller in a wireless communication system includes a transceiver to receive channel activity reports from a first node and a plurality of second nodes that are connected to the first node. The first node supports wireless communication over one or more first channels of a licensed frequency band and second channels of an unlicensed frequency band. The second node supports wireless communication over the second channels of the unlicensed frequency band. The controller also includes a processor to allocate a subset of the second channels to the first node and the plurality of second nodes based on the channel activity reports.

20 Claims, 7 Drawing Sheets

| CHANNEL QUALITY REPORT | | |
|---|---|---|
| 36 | HIGH | 2 |
| 38 | LOW | 1 |
| 40 | MEDIUM | 0 |
| ... | ... | ... |
| 165 | LOW | 0 |

EXTENDING A WIRELESS COVERAGE AREA IN AN UNLICENSED FREQUENCY BAND OF A SMALL CELL USING REMOTE RADIO HEADS

BACKGROUND

Field of the Disclosure

The present disclosure relates generally to wireless communication systems and, more particularly, to transmissions in unlicensed frequency bands of wireless communication systems.

Description of the Related Art

Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider.

Wireless communication devices that transmit or receive signals in licensed or unlicensed frequency bands are typically referred to as nodes, which may include Wi-Fi access points that operate according to IEEE 802.11 standards in the unlicensed spectrum or base stations that operate in licensed spectrum according to standards such as Long Term Evolution (LTE) standards defined by the Third Generation Partnership Project (3GPP). Base stations that operate according to LTE can implement supplementary downlink (SDL) channels in the unlicensed spectrum to provide additional bandwidth for downlink communications to user equipment that are also communicating with the base station using channels in a licensed frequency band. The licensed frequency bands may be referred to as LTE-L bands and the unlicensed frequency bands may be referred to as LTE-U bands. In some cases, base stations may also support uplink communication in the unlicensed spectrum.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Carrier aggregation can be used to bond a primary carrier (Pcell) that is anchored on a channel in a licensed frequency band with two or more secondary carriers (Scells) that are allocated channels in an unlicensed frequency band. Signaling information, control information, and uplink traffic are conveyed over the primary carrier. Users within a coverage area of the secondary carriers also receive best effort data traffic that is conveyed over one or more of the secondary carriers. Mismatches between the coverage areas of the primary and secondary carriers limit the performance gains achieved by bonding the primary and secondary carriers to users within a relatively small area around the deployment site of a node (such as a small cell) that supports the primary and secondary carriers. For example, a typical small cell combines a primary carrier that has a transmission power of approximately 5 watts with one or more secondary carriers that have transmission powers that are less than or equal to 1 watt. Consequently, users within a majority of the coverage area of the primary carrier are unable to take advantage of performance gains provided by the secondary carriers that operate on channels in the unlicensed frequency bands.

Coverage mismatches between a primary carrier in a licensed frequency band and secondary carriers in an unlicensed frequency band can be reduced or eliminated by connecting a plurality of remote radio heads (RRHs) to a node (such as a small cell) that supports a primary carrier on a channel in the licensed frequency band and one or more secondary carriers on corresponding channels in the unlicensed frequency band. The RRHs are distributed throughout a coverage area of the primary carrier (e.g., a Pcell) and support communication over the one or more secondary carriers in coverage areas that are outside the coverage areas of the secondary carriers supported by the node. The RRHs generate channel activity reports that include information indicating measured strengths of signals detected on channels of the unlicensed frequency bands. The channel activity reports may also indicate a number of other access points that are sharing the channels of the unlicensed frequency bands. The channel activity reports are provided to a controller such as a self-organized-network (SON) controller implemented by the node.

Some embodiments of the controller allocate the same channels to all of the RRHs for the secondary carriers based on a lowest channel quality indicated by the channel activity reports. In these embodiments, the node implements schedulers for the primary carrier and the one or more secondary carriers. The secondary carrier schedulers can determine a duty cycle that is used by all of the RRHs for sharing the allocated channels with other nodes such as Wi-Fi nodes. Since the same unlicensed channels are allocated to the RRHs irrespective of the channel conditions measured by each individual RRH, a "most conservative" set of operating parameters that satisfy the worst measured channel conditions encountered by any of the RRHs are allocated to all of the RRHs. Some embodiments of the controller independently allocate channels to the RRHs for the secondary carriers based on their respective channel qualities indicated in their corresponding channel activity reports. In these embodiments, the node implements a scheduler for the primary carrier and a scheduler for each of the secondary carriers supported by the node and each of the RRHs. The secondary carrier schedulers can determine duty cycles for sharing each of the channels supported by each individual node or RRH with other nodes such as Wi-Fi nodes. Location information may be used to distinguish between channels that have been allocated to the same carrier on spatially non overlapping remote nodes for downlink transmission to different users served by these remote nodes.

Figure 1:
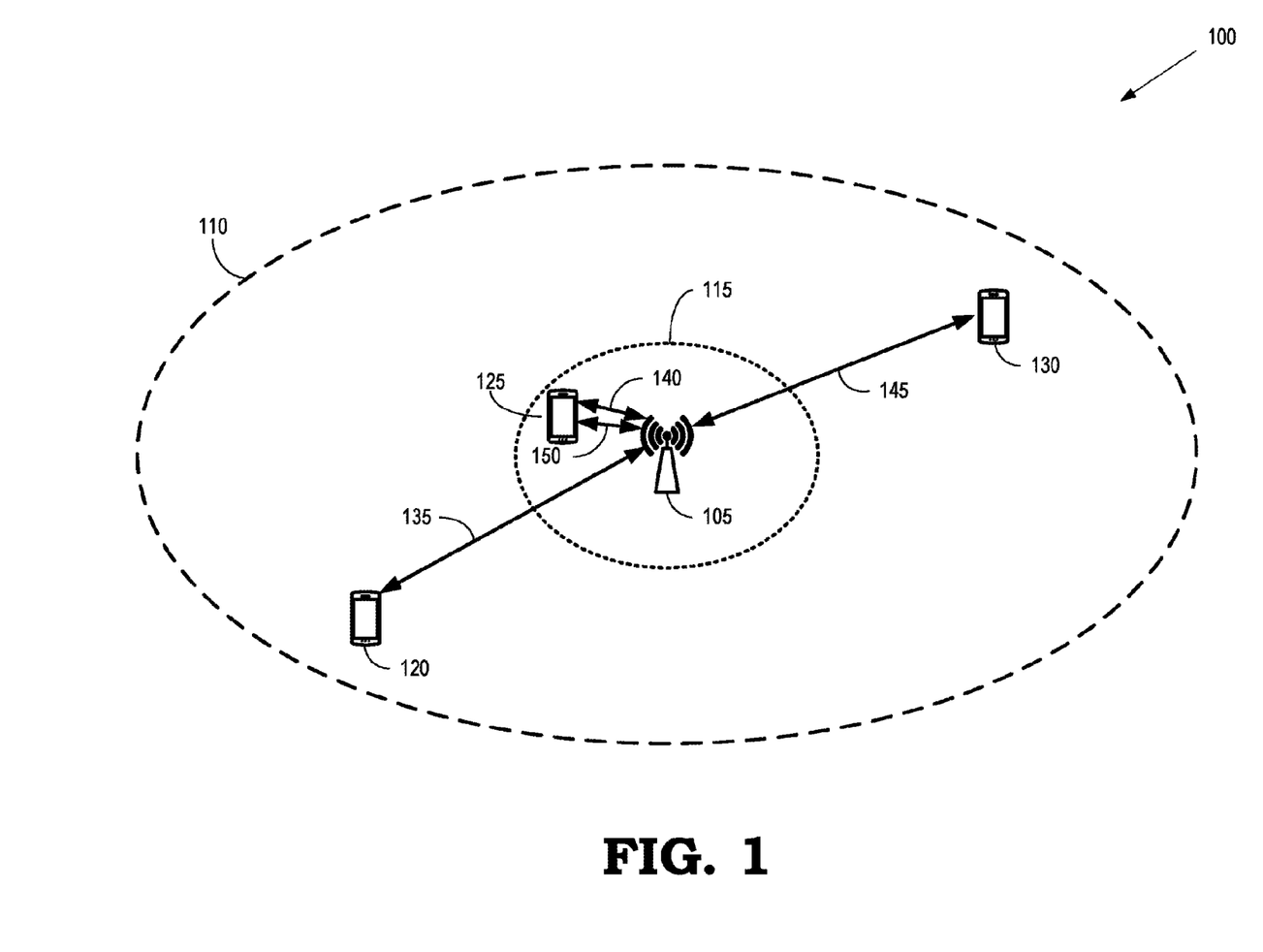
FIG. 1 is a diagram of a wireless communication system according to some embodiments.

FIG. 1 is a diagram of a wireless communication system 100 according to some embodiments. The wireless communication system includes a node 105, which may also be referred to as a base station, an eNodeB, a cell, a small cell, or using other well-known terms of art. The node 105 includes multiple transceivers for communicating over a licensed frequency band and an unlicensed frequency band. As used herein, the phrase "unlicensed frequency band" will be understood to refer to a portion of the radiofrequency spectrum that does not require a license for use and may therefore be used by any node (including the node 105 and other nodes in the wireless communication system 100 that are not shown in FIG. 1) to transmit or receive radiofrequency signals. For example, the Unlicensed National Information Infrastructure (UNII) includes portions of the radio spectrum in frequency bands that range from 5.15 GHz to 5.825 GHz. For another example, the industrial, scientific, and medical (ISM) radio bands are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. As used herein, the phrase "licensed frequency band" will be understood to refer to a portion of the radiofrequency spectrum that is licensed to a particular service provider or providers and may only be used for wireless communication by nodes that are authorized by the service provider, such as the node 105. For example, the United States Federal Communication Commission (FCC) licenses the frequency bands 698-704 MHz and 728-734 MHz to Verizon Wireless and the frequency bands 710-716 MHz and 740-746 MHz to AT&T.

The unlicensed frequency bands support a plurality of channels that may be used for uplink or downlink transmissions. For example, the 5 GHz unlicensed frequency band allocated to the UNII may be divided into a predetermined number of 20 MHz channels. Some embodiments of the node 105 may use a subset including one or more of the channels in the unlicensed frequency band to supplement downlink transmissions over channels of a licensed frequency band. For example, if the node 105 supports transmissions in the licensed frequency band according to the Long Term Evolution (LTE) standards defined by the Third Generation Partnership Project (3GPP), the node 105 may transmit best effort data on a supplemental downlink channel in the unlicensed frequency band concurrently with transmitting data, control information, or other critical information on a channel of the licensed frequency band. Some embodiments of the node 105 may use the channels in the unlicensed frequency band to support local area wireless radio access technologies (RATs) such as Wi-Fi or other communications according to the Institute of Electrical and Electronics Engineers (IEEE) 802.11 standards.

The node 105 uses a channel selection algorithm to choose one or more of the unlicensed frequency band channels for uplink or downlink transmission, e.g., transmission associated with one or more secondary carriers. Some embodiments of the node 105 select unlicensed channels based on measurements of energy received over one or more of the channels for a predetermined time interval (e.g., long-term energy detection), detection of preambles such as Wi-Fi preambles received over the channels, detection of overhead broadcast channels from neighboring nodes, and the like. For example, the node 105 may monitor (or sense) the channels in the unlicensed frequency band to detect one or more clear channels for transmission. As used herein, the term "clear" refers to a channel that is not being used for transmission by any other nodes within range of the node that detects the clear channel. A channel may be identified as a clear channel if the energy received over the channel in the predetermined time interval is less than a threshold value. Some embodiments of the node 105 may bypass transmissions in the unlicensed frequency band unless they have detected a clear channel. For example, the node 105 may back off for a random time interval and then retry the transmission in response to detecting a channel that is not clear. This approach may be referred to as listen-before-talk (LBT).

Nodes that are unable to locate a clear channel for transmission can share an occupied channel with one or more other nodes. As used herein, the term "occupied" refers to channels that are being used by nodes for downlink transmissions. For example, the node 105 can share a channel of an unlicensed frequency band with one or more other nodes (not shown in FIG. 1). Nodes that share one or more channels of the unlicensed frequency band should coordinate their transmissions so that the available resources of the shared channels are fairly shared among the different nodes, e.g., to support coexistence of the node 105 with Wi-Fi nodes and other nodes such as LTE base stations on the same channel of the unlicensed spectrum. For example, in countries such as the U.S. that do not mandate LBT regulations for operation in the unlicensed spectrum, the node 105 may employ a duty cycle that specifies ON/OFF period that allows the node 105 to transmit signals on the shared channel for a predetermined time interval (ON) and requires that the node 105 bypass transmissions on the shared channel during a subsequent time interval (OFF). The ON interval is typically 20 ms or less in duration. The channel selection algorithm takes into consideration the number of nodes sharing the unlicensed channel and picks an unlicensed channel that has the least number of nodes sharing the channel.

The duty cycle for the ON/OFF time intervals is determined by the number of devices that are sharing the channel. For example, if the node 105 is sharing the same channel in the unlicensed frequency band with two other nodes, the node 105 may be allocated ⅓ or 33% of the duty cycle for downlink transmissions and the node 105 may bypass transmissions during the remaining ⅔ (or 67%) so that the other nodes can transmit downlink signals with minimal interference from the node 105. Some embodiments of the node 105 acquire the channel for an ON interval of 20 ms. The duty cycle for downlink transmissions may therefore be 60 ms when the node 105 is sharing the channel with two other nodes. The node 105 bypasses downlink transmissions during the remaining 40 ms of the duty cycle, which may be referred to as the OFF interval.

The node 105 may allocate different transmission powers to channels in the licensed frequency band and channels in the unlicensed frequency band. For example, the node 105 may allocate 5 watts (W) of transmit power per antenna path when the node 105 is deployed in a 2×2 multiple-in-multiple-out (MIMO) antenna configuration. In contrast, transmission powers in the unlicensed frequency band may be constrained to 1 W or less. The difference in the transmission powers generates a mismatch between the coverage area 110 of the primary carrier (which may also be referred to as a Pcell) associated with the licensed frequency band and the coverage area 115 of one or more secondary carriers (which may also be referred to as Scells) associated with the unlicensed frequency band. Consequently, not all of the user equipment 120, 125, 130 in the coverage area 110 can benefit from the additional bandwidth provided by channels in the unlicensed frequency band. For example, the node 105 may establish wireless communication links 135, 140, 145 on one or more channels of the licensed frequency band with the user equipment 120, 125, 130 that are within the coverage area 110. However, the node 105 may only establish a wireless communication link 150 on one or more channels of the unlicensed frequency band with the user equipment 125 that is within the coverage area 115.

Figure 2:
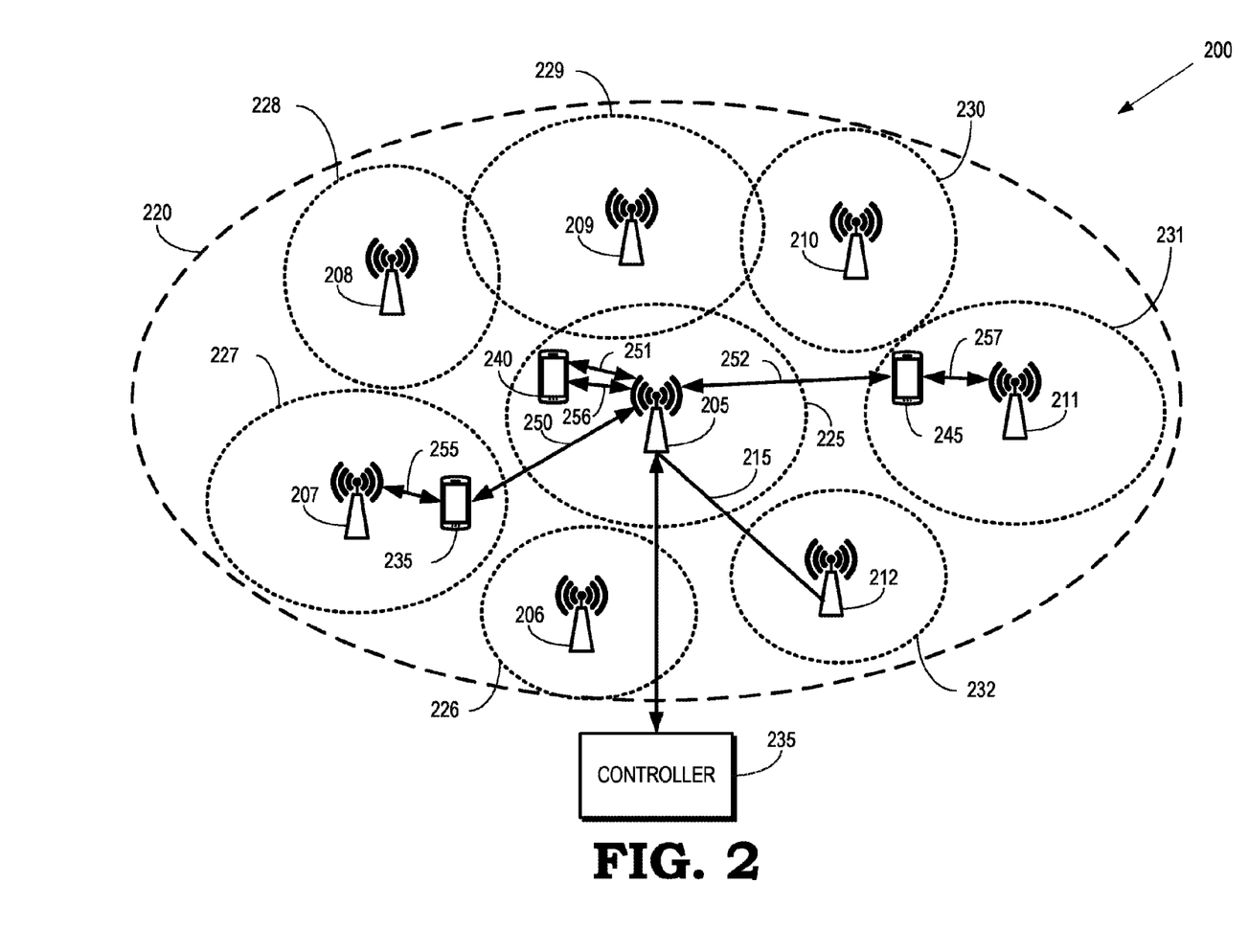
FIG. 2 is a diagram of a wireless communication system that implements a heterogeneous network to extend the unlicensed spectrum coverage of a node according to some embodiments.

FIG. 2 is a diagram of a wireless communication system 200 that implements a heterogeneous network to extend the coverage of a node 205 according to some embodiments. The node 205 includes multiple transceivers for communicating over a licensed frequency band and an unlicensed frequency band in the manner discussed herein with regard to embodiments of the node 105 shown in FIG. 1. The node 205 is also interconnected with additional nodes 206, 207, 208, 209, 210, 211, 212 (which are collectively referred to herein as "the nodes 206-212") over a network 215. The set of nodes 205, 206-212 that includes the node 205 may be referred to as "the nodes 205-212." In the interest of clarity, the network 215 is represented by a connection 215 between the nodes 205 and the nodes 206-212. However, each of the nodes 206-212 is connected to the nodes 205 by the network 215. Some embodiments of the nodes 206-212 include transceivers for communicating in the unlicensed frequency band but the nodes 206-212 do not include transceivers for communicating in the licensed frequency band. The nodes 206-212 may be implemented as remote radio heads (RRHs) that are used to transmit downlink information provided by the node 205 over the network 215 and to provide uplink information received over the air interface to the node 205 over the network 215. Each of the nodes 206-212 supports one or more secondary carriers (which may be referred to as Scells) using a channel of the unlicensed frequency band for each secondary carrier. For example, the node 206 may support a first Scell using a first channel of the unlicensed frequency band and a second Scell using a second channel of the unlicensed frequency band.

The node 205 allocates different transmission powers to the licensed frequency band and the unlicensed frequency band. Thus, the node 205 supports a relatively large coverage area 220 for communication in the licensed frequency band and a relatively small coverage area 225 for communication in the unlicensed frequency band. The mismatch between the coverage areas 220, 225 is reduced by the additional coverage in the coverage areas 226, 227, 228, 229, 230, 231, 232 (which are referred to collectively as "the coverage areas 226-232") for communication in the unlicensed frequency band supported by the additional nodes 206-212. The coverage areas 226-232 are fully encompassed by the coverage area 220. For example, signaling and uplink communications may be handled by the primary carrier (Pcell) supported by the node 205 and consequently the coverage areas 226-232 must be encompassed by the coverage area 220 in order to receive the signaling and support downlink transmissions in the unlicensed band within the coverage areas 226-232. As discussed above, some embodiments of the nodes 206-212 can support multiple secondary carriers on different frequencies of the unlicensed frequency band. The multiple Scells may have the same or different coverage areas.

User equipment 235, 240, 245 within the coverage area 220 can establish wireless communication links 250, 251, 252 for uplink or downlink communication in the licensed frequency band with the node 205. Uplink or downlink bandwidth provided to the user equipment 235, 240, 245 may also be supplemented by binding the wireless communication links 250, 251, 252 to wireless communication links 255, 256, 257 in the unlicensed frequency band. The information transmitted over the bound links can be coordinated by the node 205. For example, a first portion of information addressed to the user equipment 240 may be transmitted over the wireless communication link 251 using channels of the licensed frequency band and a second portion of the information addressed to the user equipment 240 may be transmitted over wireless communication link 256 using channels of the unlicensed frequency band. For another example, a first portion of the information addressed to the user equipment 235 may be transmitted over the wireless communication link 250 using channels of the licensed frequency band and a second portion of the information addressed to the user equipment 235 may be transmitted from the node 205 to the node 207 via the network 215. The node 207 may then transmit the second portion to the user equipment 235 over the wireless communication link 255 using channels of the unlicensed frequency band.

The wireless communication system 200 includes a controller 235. Although the controller 235 is depicted as a standalone entity in FIG. 2, some embodiments of the controller 235 are implemented in the node 205. The nodes 206-212 are therefore connected to the controller 235 by the network 215. The nodes 206-212 transmit channel activity reports to the controller 235 over the network 215. Channel activity reports for unlicensed frequency bands supported by the node 205 may also be provided to the controller 235, e.g., using internal signaling paths in the node 205 when the controller 235 is implemented by the node 205. Some embodiments of the channel activity reports include information identifying channels of the unlicensed frequency bands supported by the nodes 205-212, values of measurements of signal strength performed on the channels of the unlicensed frequency band by the nodes 205-212, an indication of numbers of other nodes that are sharing channels in the unlicensed frequency band, and the like. Some embodiments of the controller 235 are implemented as a standalone entity that is separate from the node 205, in which case the node 205 collects the received channel activity reports and provides them to the controller 235.

The controller 235 allocates a subset including one or more of the channels of the unlicensed frequency band to the nodes 205-212 based on information included in the channel activity reports. Some embodiments of the controller 235 include a processor configured to allocate the channels of the unlicensed frequency band to the nodes 205-212 for uplink or downlink transmissions during scheduled time intervals. The node 205 may implement schedulers (not shown in FIG. 2) for scheduling transmissions by the nodes 205-212 based on the allocations generated by the controller 235. For example, if each of the nodes 206-212 supports two Scells and the controller 235 allocates the same channels of the unlicensed frequency band to all of the nodes 205-212, the node 205 may include a centralized user equipment scheduler and three cell schedulers: one for the primary carrier (Pcell) corresponding to a channel of the licensed frequency band supported by the node 205 and two for the Scells supported by the nodes 205-212 on channels of the unlicensed frequency band. For another example, if each of the nodes 206-212 supports two Scells and the controller 235 independently allocates different channels of the unlicensed frequency band to the nodes 205-212, the node 205 may include a centralized user equipment scheduler, a Pcell scheduler, and one Scell scheduler for each of the plurality of channels in the unlicensed frequency band. The nine 20 MHz channels in the 5 GHz unlicensed frequency band may therefore be associated with nine Scell schedulers in the node 205. The Scell schedulers can independently schedule communication by the nodes 205-212 for transmission on the allocated channels of the unlicensed frequency band. All of the nine available 20 MHz channels may therefore be used concurrently if the wireless communication system 200 includes at least five nodes 206-212 that each support two Scells.

Some embodiments of the controller 235 determine duty cycles for transmissions on the channels of the unlicensed frequency bands based on information included in the channel activity reports. Each of the nodes 205-212 may be configured to detect the presence of other nodes that are sharing channels of the unlicensed frequency band, e.g., by decoding preambles of Wi-Fi transmissions to detect the presence of a Wi-Fi node transmitting on the shared channel. The nodes 205-212 can also determine how many nodes are sharing each channel and so the channel activity reports provided by the nodes 205-212 may include information indicating the number of nodes sharing each channel of the unlicensed frequency band. The controller 235 then determines an ON/OFF duty cycle based on the information indicating the number of sharing nodes. For example, if the channel activity report indicates that at least one of the nodes 205-212 is sharing the same channel in the unlicensed frequency band with two other nodes, one or more of the nodes 205-212 may be allocated ⅓ or 33% of the duty cycle for downlink transmissions on the shared channel and the nodes 205-212 may bypass transmissions during the remaining ⅔ (or 67%) so that the other nodes can transmit downlink signals with minimal interference. The same duty cycle may be assigned to all the nodes 205-212 for communication on the same allocated channels or different duty cycles may be assigned to different nodes 205-212 for communication on different allocated channels, as discussed herein.

Figure 3:
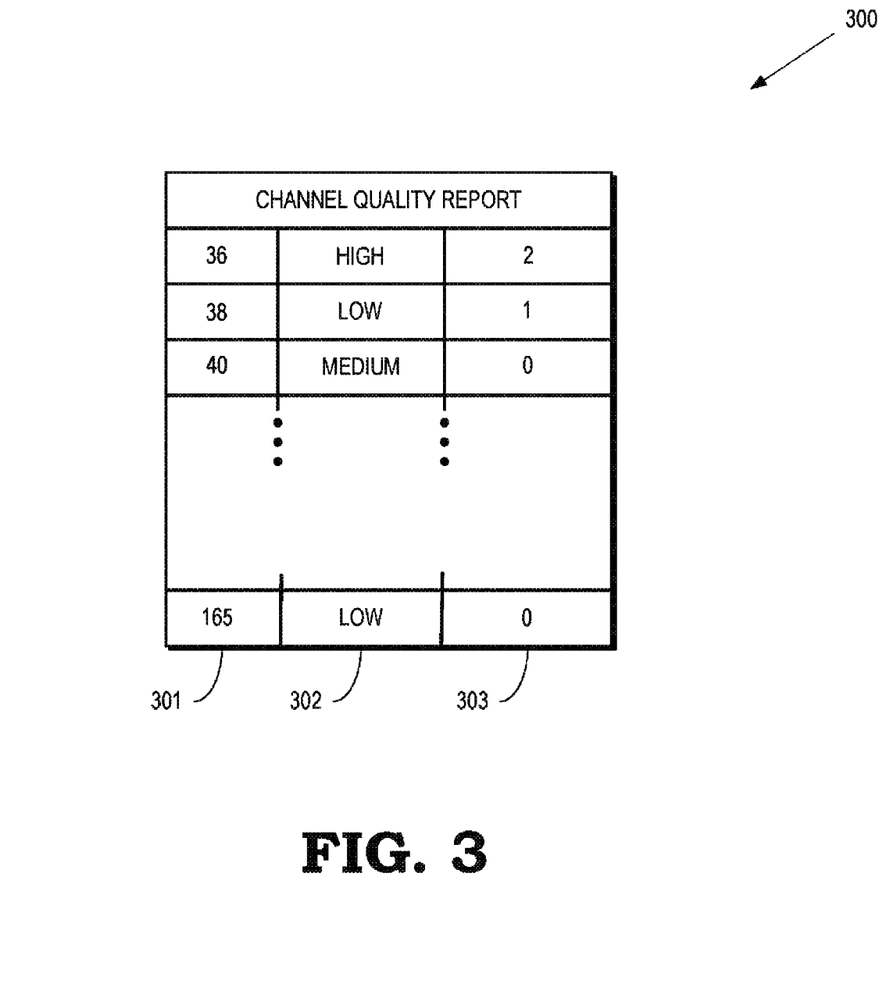
FIG. 3 is a block diagram of a channel quality report according to some embodiments.

FIG. 3 is a block diagram of a channel quality report 300 according to some embodiments. The channel quality report 300 may be generated by some embodiments of the nodes 205-212 and provided to the controller 235 shown in FIG. 2. The channel quality report 300 includes a column 301 that includes fields that convey information indicating a channel number of a channel in the unlicensed frequency band that is supported and monitored by the node. For example, the channel numbers in the fields of the column 301 include the channels 36, 38, 40, and 165 defined in the 5 GHz unlicensed frequency band. The fields in the column 301 may also include other channel numbers corresponding to other unlicensed frequency bands. The channel quality report 300 also includes a column 302 that includes fields for conveying information indicating values of measurements of signal strengths performed by the node. Some embodiments of the node perform measurements of the signal strengths during predetermined measurement gaps in which the node does not transmit or attempt to receive information on the corresponding channel. The values of the signal strength measurements may be conveyed as relative values (e.g., HIGH, MEDIUM, and LOW), as measured values (e.g., the measured value in decibels), or using other values (e.g. actual measurement reading in dB) indicative of the measured signal strength. The channel quality report 300 further includes a column 303 that includes fields for conveying information indicating a number of other nodes that are sharing the channel of the unlicensed frequency band. Some embodiments of the node are configured to decode portions of signals received from other nodes on channels of the unlicensed frequency band, such as Wi-Fi preambles. The decoded information may then be used to determine the number of other nodes that are sharing the channel.

Figure 4:
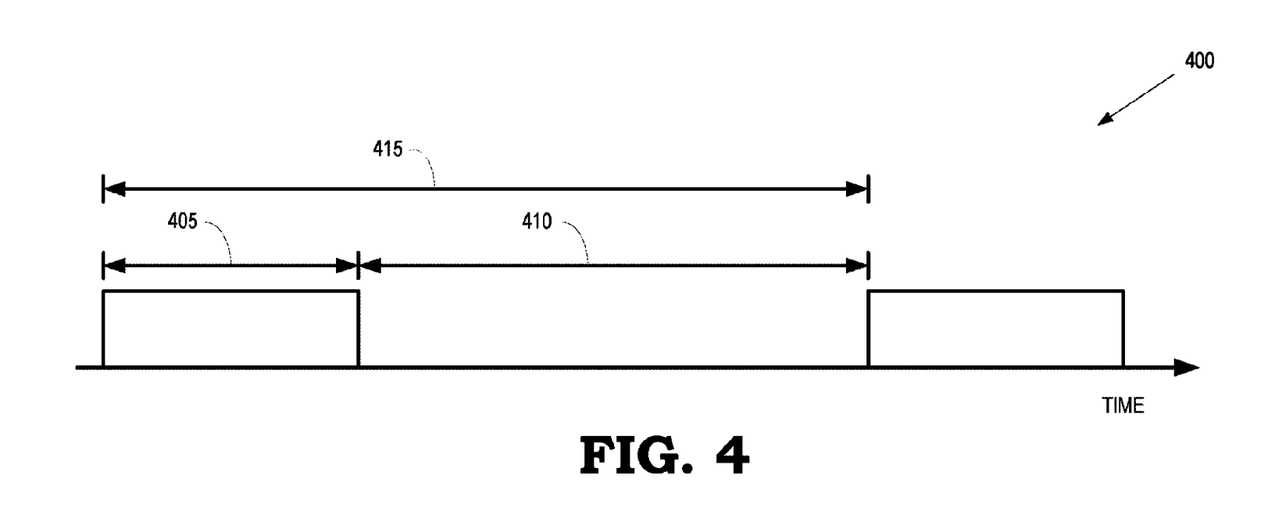
FIG. 4 is a diagram showing an allocation of time intervals for downlink transmissions by a node on a channel of an unlicensed frequency band that is shared by two other nodes according to some embodiments.

FIG. 4 is a diagram showing an allocation 400 of time intervals for downlink transmissions by a node that does not support LBT on a channel of an unlicensed frequency band that is shared by two other nodes according to some embodiments. The horizontal axis indicates time increasing from left to right. The duty cycle indicated by the allocation 400 of time intervals in FIG. 4 may be allocated to one or more of the nodes 205-212 by the controller 235 shown in FIG. 2. In the illustrated embodiment, the node shares the channel of the unlicensed frequency band with two other nodes, which may operate according to a different radio access technology (such as Wi-Fi). The node acquires or reserves the channel for downlink transmissions during an ON interval 405 and bypasses downlink transmissions on the channel during an OFF interval 410. The duty cycle 415 is equal to the sum of the ON interval 405 and the OFF interval 410. For example, the ON interval 405 may be 20 ms and the OFF interval 410 may be 40 ms so that the duty cycle 415 is 60 ms. The duty cycle 415 may repeat indefinitely or for a predetermined amount of time. The duty cycle 415 may be increased in response to additional nodes sharing the channel or decreased in response to one or more nodes ending transmissions over the shared channel.

Figure 5:
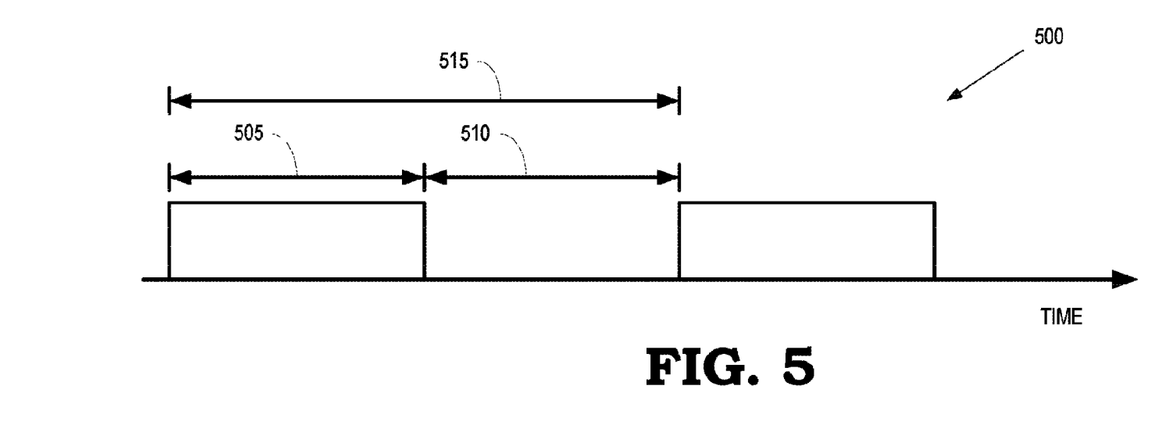
FIG. 5 is a diagram showing an allocation of time intervals for downlink transmissions by a node on a channel of an unlicensed frequency band that is shared with one other node according to some embodiments.

FIG. 5 is a diagram showing an allocation 500 of time intervals for downlink transmissions by a node on a channel of an unlicensed frequency band that is shared with one other node according to some embodiments. The horizontal axis indicates time increasing from left to right. The duty cycle indicated by the allocation 500 of time intervals in FIG. 5 may be allocated to one or more of the nodes 205-212 by the controller 235 shown in FIG. 2. In the illustrated embodiment, the node shares the channel of the unlicensed frequency band with one other node, which may operate according to a different radio access technology (such as Wi-Fi). The node acquires or reserves the channel for downlink transmissions during an ON interval 505 and bypasses downlink transmissions on the channel during an OFF interval 510. The duty cycle 515 is equal to the sum of the ON interval 505 and the OFF interval 510. For example, the ON interval 505 may be 20 ms and the OFF interval 510 may be 20 ms so that the duty cycle 515 is 40 ms. The ON interval 505 is equal to the OFF interval 510 because the channel is shared between two nodes. The duty cycle 515 may repeat indefinitely or for a predetermined amount of time.

Figure 6:
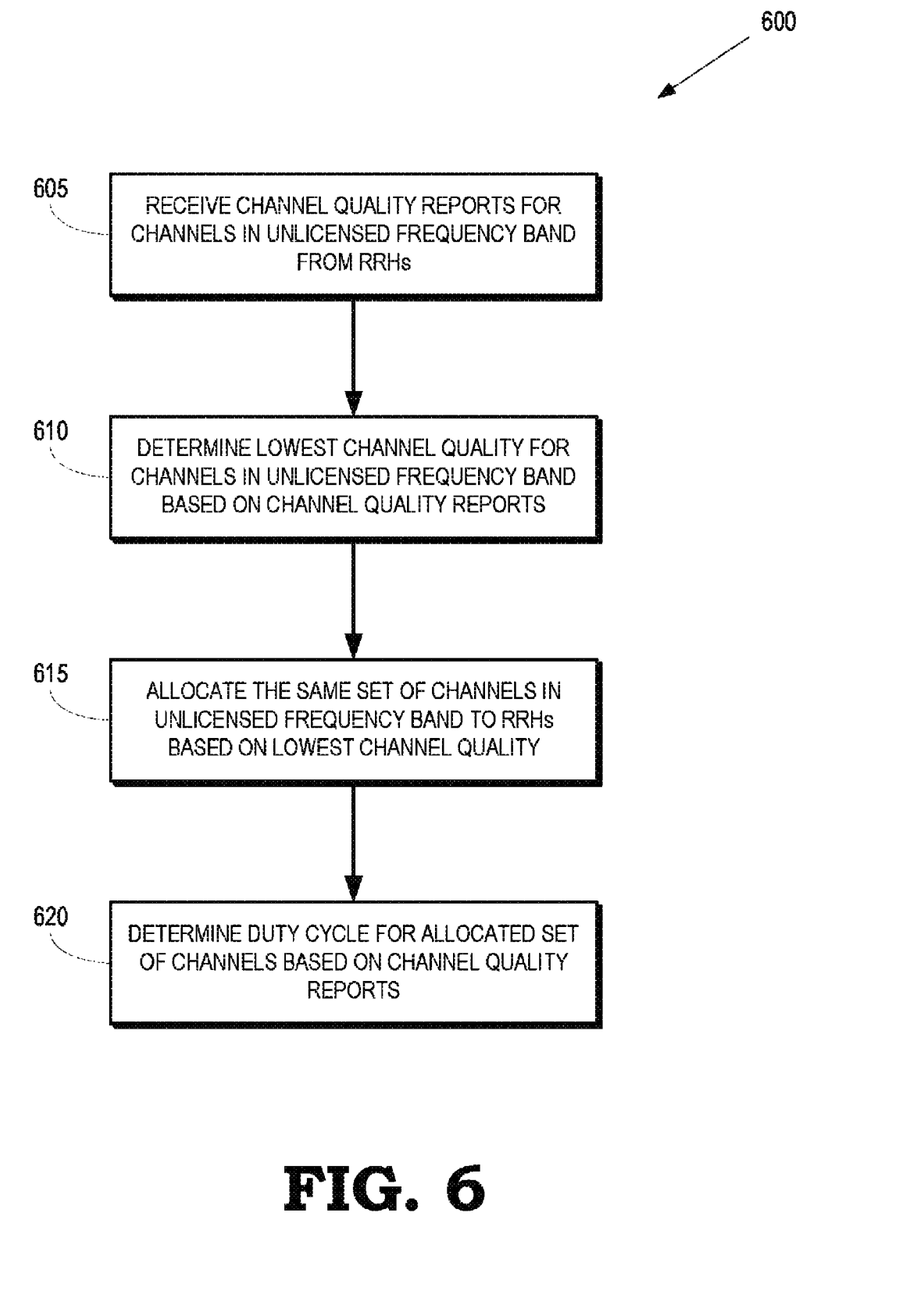
FIG. 6 is a flow diagram of a method for allocating the same set of channels in an unlicensed frequency band to a plurality of interconnected nodes that include one or more remote radio heads (RRHs) that are connected to a small cell according to some embodiments.

FIG. 6 is a flow diagram of a method 600 for allocating the same set of channels in an unlicensed frequency band to a plurality of interconnected nodes that include one or more remote radio heads (RRHs) that are connected to a small cell according to some embodiments. The method 600 may be implemented in some embodiments of the nodes 205-212 and the controller 235 shown in FIG. 2. At block 605, the controller receives channel quality reports for channels in an unlicensed frequency band from the RRHs. The channel quality reports may be in the format of the channel quality report 300 depicted in FIG. 3.

At block 610, the controller determines a lowest channel quality for each of the channels in the unlicensed frequency band based on the channel quality reports. For example, if the controller receives channel quality reports from a small cell and three RRHs, the controller has access to four values of the channel quality for each of the channels of the unlicensed frequency band. As discussed herein, the channel quality may be indicated in relative values (e.g., HIGH, MEDIUM, and LOW), measured values (e.g., the measured value in decibels), or using other values indicative of the measured signal strength on the corresponding channels. The lowest channel quality for a channel is then given by the lowest value indicated in the channel quality reports provided by all four nodes. For example, if three nodes report a channel quality of HIGH for a channel and one node reports a channel quality of LOW for the channel, the lowest channel quality for that channel is LOW.

At block 615, the controller allocates the same set of channels in the unlicensed frequency band to the small cell and the RRHs based on the lowest channel qualities of the channels. For example, if there are five channels available in the unlicensed frequency band and the lowest channel qualities for the channels are HIGH, MEDIUM, MEDIUM, LOW and LOW, the controller may allocate the first channel to the small cell and the RRHs. The total number of channels in the unlicensed frequency band and the number of channels that are allocated to the small cell and the RRHs may differ from these example values. Some embodiments of the controller may allocate more than one channel to the small cell and the RRHs, and the allocated channels may be selected from more or fewer than five channels in the unlicensed frequency band.

At block 620, the controller determines a duty cycle for communication over the allocated channels by the small cell and the RRHs for non LBT mode of operation. The duty cycle is determined based on the highest number of sharing nodes detected by the small cell and the RRHs, as reported in the channel quality reports. For example, if one of the nodes reports that it has detected two other nodes sharing a channel in the unlicensed frequency band and the other three nodes report that they have detected only one other node sharing the channel, the highest number of sharing nodes for the channel is set equal to two. The duty cycle for an allocated channel is determined based on the highest number of sharing nodes for the allocated channel. For example, if the highest number of sharing nodes for the allocated channel is equal to two, then the controller defines a duty cycle for the small cell and the RRHs that allows transmission during ⅓ of the duty cycle and requires the small cell and the RRHs to bypass transmissions during ⅔ of the duty cycle.

In some embodiments, the duty cycles and the channel allocations may both be determined using information in the channel activity reports that indicates channel qualities and the number of nodes that share a channel, e.g., by integrating portions of the steps 610, 615, 620 into a single process. For example, if the channel activity reports from all of the nodes indicate that a first channel has a slightly higher lowest channel quality than a second channel, the step 615 would allocate the first channel to all of the nodes. Furthermore, if the channel activity reports from three of the nodes indicate that the first channel is not shared by other nodes and the channel activity report received from one node shows the first channel is shared by two other nodes, the steps 620 would allocate a duty cycle of ⅓ to all the nodes for the first channel. However, if the channel activity reports indicate that the second channel is only shared with one other node, the integrated channel/duty cycle allocation algorithm may allocate the second channel to all of the nodes with a duty cycle of ½, leading to higher overall throughput. These embodiments may be particularly useful for non-LBT modes of operation where the channel duty cycle is determined by the number of the nodes sharing the channel. For embodiments that implement an LBT mode of operation, the channel quality indicated in the channel activity reports be given a higher rating than the number of nodes sharing the channel.

Figure 7:
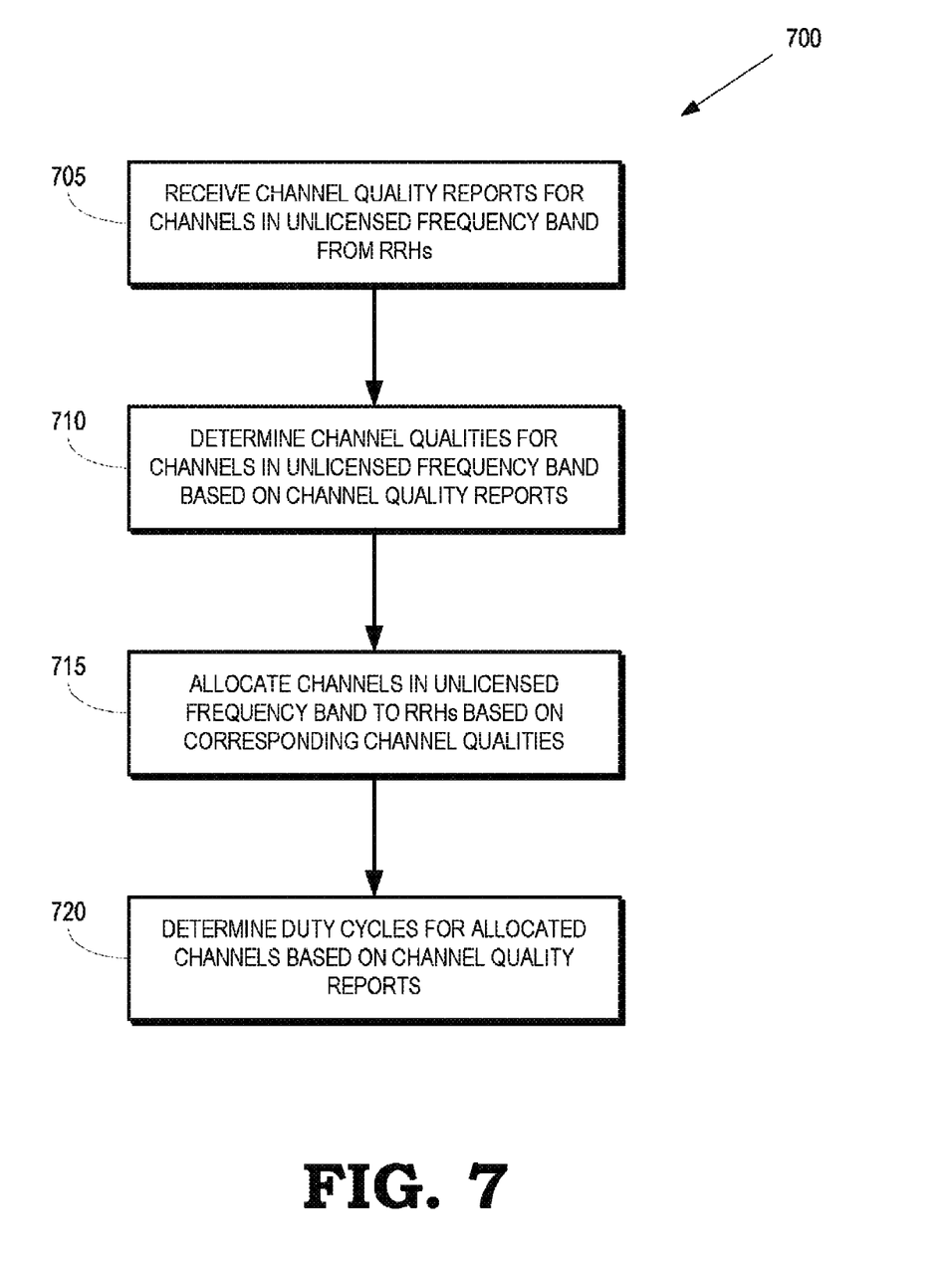
FIG. 7 is a flow diagram of a method for allocating different channels in an unlicensed frequency band based on local channel conditions to a plurality of interconnected nodes that include one or more RRHs that are connected to a small cell according to some embodiments.

FIG. 7 is a flow diagram of a method 700 for allocating different channels in an unlicensed frequency band to a plurality of interconnected nodes that include one or more RRHs that are connected to a small cell according to some embodiments. The method 700 may be implemented in some embodiments of the nodes 205-212 and the controller 235 shown in FIG. 2. At block 705, the controller receives channel quality reports for channels in an unlicensed frequency band from the RRHs. The channel quality reports may be in the format of the channel quality report 300 depicted in FIG. 3.

At block 710, the controller determines channel qualities for each of the channels in the unlicensed frequency band that have been reported by the small cell and the RRHs. For example, if there are five channels available in the unlicensed frequency band, the small cell may report signal strength measurement values of (HIGH, MEDIUM, MEDIUM, LOW, LOW), a first RRH may report signal strength measurement values of (MEDIUM, HIGH, MEDIUM, LOW, LOW), a second RRH may report signal strength measurement values of (MEDIUM, LOW, HIGH, LOW, LOW), and a third RRH may report signal strength measurement values of (MEDIUM, LOW, MEDIUM, HIGH, LOW). However, as discussed herein, the signal strength measurement values may be reported in other formats, such as in decibels.

At block 715, the controller allocates channels in the unlicensed frequency band to the small cell and the RRHs based on the channel qualities. Different channels can be allocated to the small cell and the RRHs. For example, the controller may allocate the first channel to the small cell, the second channel to the first RRH, the third channel to the second RRH, and the fourth channel to the third RRH because these nodes reported HIGH signal strength measurement values associated with the corresponding channels. Some embodiments of the small cell or the RRHs can support communication over multiple channels in the unlicensed frequency band, e.g., by supporting multiple Scells. The controller may therefore allocate more than one channel to the small cell or the RRHs, which allows the wireless communication system to support concurrent communication over a larger number of channels of the unlicensed frequency band. For example, if the system includes five RRHs that each support two Scells, all nine of the 20 MHz channels in the unlicensed frequency band at 5 GHz can be concurrently allocated for transmission over the air interface. Location information may be used to support reuse of channels in the unlicensed frequency band. For example, if two of the RRHs are sufficiently separated that they do not interfere with each other, as indicated by information indicating the locations of the RRHs, the controller can allocate the same unlicensed carrier radio resources to the two RRHs for concurrent transmission over the air interface to their respective users.

At block 720, the controller determines duty cycles for communication over the allocated channels by the small cell and the RRHs. The duty cycle for each of the nodes is determined based on the number of sharing nodes detected on the allocated channels by the corresponding node, as reported in the channel quality reports. For example, if a first RRH reports that it has detected two other nodes sharing its allocated channel in the unlicensed frequency band, then the controller defines a duty cycle for the first RRH that allows transmission on the allocated channel during ⅓ of the duty cycle and requires the first RRH to bypass transmissions during ⅔ of the duty cycle. The nodes are not constrained to use the same duty cycle. For example, if a second RRH reports that it has detected one other node sharing its allocated channel in the unlicensed frequency band, then the controller defines a duty cycle for the second RRH that allows transmission during ½ of the duty cycle and requires the second RRH to bypass transmissions during ½ of the duty cycle.

As discussed above, some embodiments of the controller determine the duty cycles and the channel allocations using information in the channel activity reports that indicates channel qualities and the number of nodes that share a channel, e.g., by integrating portions of the steps 710, 715, 720 into a single process. These embodiments may support choosing a channel with a relatively low channel quality (but a lower number of sharing nodes) over a channel with a relatively high channel quality (but a higher number of sharing nodes). Different weights may be applied to the channel quality information and the node-sharing information in the integrated channel/duty cycle allocation algorithm.

Figure 8:
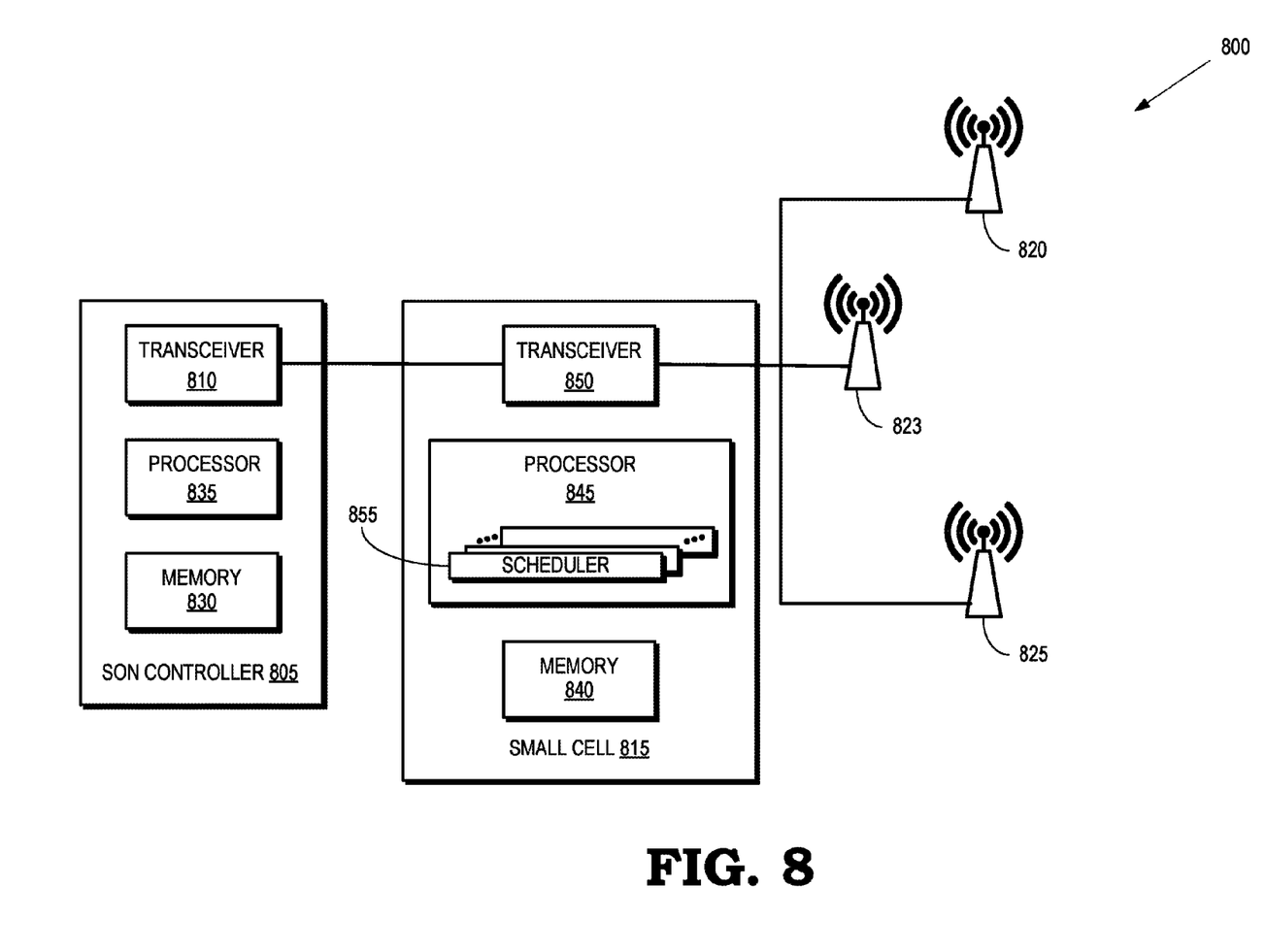
FIG. 8 is a block diagram of a wireless communication system according to some embodiments.

FIG. 8 is a block diagram of a wireless communication system 800 according to some embodiments. The wireless communication system 800 includes a controller such as a self-organizing network (SON) controller 805. The SON controller 805 may be used to implement some embodiments of the controller 235 shown in FIG. 2. The SON controller 805 includes a transceiver 810 that is interconnected to a small cell 815 that is configured for uplink or downlink communication in a licensed frequency band and an unlicensed frequency band. Some embodiments of the SON controller 805 and the small cell 815 are integrated into a single entity and may therefore share some of the elements described herein such as memories, processors, or transceivers.

The controller 805 is also interconnected with RRHs 820, 823, 825 that are configured for uplink or downlink communication in the unlicensed frequency band. For example, the node 815 may be a small cell such as the node 205 shown in FIG. 2 and the nodes 820, 825 may be RRHs such as the nodes 206-212 shown in FIG. 2. In the interest of clarity, the connections between the SON controller 805 and the RRHs 820, 823, 825 are not shown in FIG. 8. The transceiver 810 receives channel activity reports from the nodes 815, 820, 823, 825 and transmits signals indicating allocations of channels in the unlicensed frequency bands to the nodes 815, 820, 823, 825. Some embodiments of the transceiver 810 also transmit signals indicating the duty cycles of the allocated channels to the nodes 815, 820, 823, 825, as well as other information used to configure the nodes 815, 820, 823, 825.

The SON controller 805 includes memory 830 for storing information such as processor instructions, data for transmission, received data, and the like. A processor 835 may be used to process information for transmission, process received information, or perform other operations as discussed herein, e.g., by executing instructions stored in the memory 830. Some embodiments of the transceiver 810, the memory 830, and the processor 835 may be configured to perform embodiments of the method 600 shown in FIG. 6 or the method 700 shown in FIG. 7.

The small cell 815 includes memory 840 for storing information such as processor instructions, data for transmission, received data, and the like. A processor 845 may be used to process information for transmission, process received information, or perform other operations as discussed herein, e.g., by executing instructions stored in the memory 840. The small cell 815 also includes a transceiver 850 that is configured for communication with the transceiver 810 in the SON controller 805. The transceiver 850 is also configured to exchange signals with the RRHs 820, 823, 825. For example, the transceiver 850 may transmit information indicating allocations of channels or duty cycles for the channels in the unlicensed frequency band (as determined by the SON controller 805) to the appropriate RRHs 820, 823, 825. The transceiver 850 may also convey information that is to be transmitted over a downlink by the RRHs 820, 823, 825 or information that has been received over an uplink by the RRHs 820, 823, 825.

Some embodiments of the small cell 815 implement a plurality of schedulers 855 that are configured to schedule uplink or downlink transmissions by the small cell 815 in the licensed frequency band or allocated channels of the unlicensed frequency band, as well as uplink or downlink transmissions by the nodes 820, 823, 825 in the allocated channels of the unlicensed frequency band. The number of schedulers corresponds to the number of channels that can be independently allocated to the nodes 815, 820, 823, 825. For example, if the SON controller 805 is configured to allocate the same channels of the unlicensed frequency band and the same duty cycle to each carrier supported by the nodes 815, 820, 823, 825 and if each of the nodes 815, 820, 823, 825 can support concurrent communication over two secondary carriers (or Scells), the small cell 815 may implement a centralized user equipment scheduler, a scheduler for a primary carrier in the licensed frequency band, and two schedulers for communication over the two channels in the unlicensed frequency band. For another example, if the SON controller 805 is configured to independently allocate different channels of the unlicensed frequency band and different duty cycles to carriers supported by the nodes 815, 820, 823, 825 and if each of the nodes 815, 820, 823, 825 can support concurrent communication over two secondary carriers (or Scells), the small cell 815 may implement a centralized user equipment scheduler, a scheduler for communication using the primary carrier in the licensed frequency band, and a scheduler for each of the available channels of the unlicensed frequency band. The transceiver 850 is also configured to transmit the scheduling information generated by the schedulers 855 to the RRHs 820, 823, 825.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a controller in a wireless communication system, channel activity reports from a first node and a plurality of second nodes that are connected to the first node, wherein the first node supports wireless communication over at least one first channel of a licensed frequency band and second channels of an unlicensed frequency band, and wherein the second node supports wireless communication over the second channels of the unlicensed frequency band, and wherein the at least one first channel supports a primary carrier that conveys control information for at least one secondary carrier supported by the second channels; and
allocating a subset of the second channels to the first node and the plurality of second nodes based on the channel activity reports.

2. The method of claim 1, wherein receiving the channel activity reports comprises receiving channel activity reports including information indicating values of measurements of signal strengths performed by the first node and the plurality of second nodes on the second channels.

3. The method of claim 2, wherein allocating the subset of the second channels comprises allocating the subset of the second channels based on the measured values of the signal strengths on the second channels.

4. A method comprising:
receiving, at a controller in a wireless communication system, channel activity reports from a first node and a plurality of second nodes that are connected to the first node, wherein the first node supports wireless communication over at least one first channel of a licensed frequency band and second channels of an unlicensed frequency band, and wherein the second node supports wireless communication over the second channels of the unlicensed frequency band, wherein receiving the channel activity reports comprises receiving channel activity reports including information indicating values of measurements of signal strengths performed by the first node and the plurality of second nodes on the second channels, and wherein receiving the channel activity reports comprises receiving information indicating numbers of third nodes that are sharing each of the second channels; and
allocating a subset of the second channels to the first node and the plurality of second nodes based on the channel activity reports.

5. The method of claim 4, wherein allocating the subset of the second channels comprises allocating the same subset of the second channels to the first node and the plurality of second nodes.

6. The method of claim 5, wherein allocating the same subset of the second channels to the first node and the plurality of second nodes comprises determining, for each second channel in the subset of second channels, a lowest channel quality based on the measured values of the signal strength on the second channels indicated in the channel activity reports received from the first node and the plurality of second nodes for each of the second channels and allocating the subset of the second channels based on the lowest channel qualities.

7. The method of claim 5, wherein allocating the same subset of the second channels to the first node and the plurality of second nodes comprises determining, for each second channel in the subset of second channels, a largest number of third nodes reported by the first node and the plurality of second nodes to be sharing each second channel and allocating a duty cycle to each second channel based on the corresponding largest number of third nodes.

8. The method of claim 4, wherein allocating the subset of the second channels to the first node and the plurality of second nodes comprises allocating different subsets of the second channels to the first node and the plurality of second nodes based on the corresponding channel activity reports received from the first node and the plurality of second nodes.

9. The method of claim 8, wherein allocating the different subsets of the second channels comprises allocating different duty cycles to the first node and the plurality of second nodes for transmission on each second channel in the different subsets of the second channels based on corresponding numbers of third nodes reported by the first node and the plurality of second nodes to be sharing each second channel.

10. The method of claim 8, wherein allocating the different subsets of the second channels to the first node and the plurality of second nodes comprises allocating the different subsets of the second channels based on information indicating locations of the first node and the plurality of second nodes.

11. An apparatus comprising:
a transceiver to receive channel activity reports from a first node and a plurality of second nodes that are connected to the first node, wherein the first node supports wireless communication over at least one first channel of a licensed frequency band and second channels of an unlicensed frequency band, and wherein the second node supports wireless communication over the second channels of the unlicensed frequency band, and wherein the at least one first channel supports a primary carrier that conveys control information for at least one secondary carrier supported by the second channels; and
a processor to allocate a subset of the second channels to the first node and the plurality of second nodes based on the channel activity reports.

12. The apparatus of claim 11, wherein the transceiver is to receive channel activity reports including information indicating values of measurements of signal strengths performed by the first node and the plurality of second nodes on the second channels.

13. The apparatus of claim 12, wherein the apparatus is to allocate the subset of the second channels based on the measured values of the signal strengths on the second channels.

14. An apparatus comprising:
a transceiver to receive channel activity reports from a first node and a plurality of second nodes that are connected to the first node, wherein the first node supports wireless communication over at least one first channel of a licensed frequency band and second channels of an unlicensed frequency band, and wherein the second node supports wireless communication over the second channels of the unlicensed frequency band, wherein the transceiver is to receive channel activity reports including information indicating values of measurements of signal strengths performed by the first node and the plurality of second nodes on the second channels, and wherein the transceiver is to receive information indicating numbers of third nodes that are sharing each of the second channels; and
a processor to allocate a subset of the second channels to the first node and the plurality of second nodes based on the channel activity reports.

15. The apparatus of claim 14, wherein the processor is to allocate the same subset of the second channels to the first node and the plurality of second nodes.

16. The apparatus of claim 15, wherein the processor is to determine, for each second channel in the subset of second channels, a lowest channel quality based on the measured values of the signal strength on the second channels indicated in the channel activity reports received from the first node and the plurality of second nodes for each of the second channels and allocating the subset of the second channels based on the lowest channel qualities.

17. The apparatus of claim 15, wherein the processor is to determine, for each second channel in the subset of second channels, a largest number of third nodes reported by the first node and the plurality of second nodes to be sharing each second channel and allocating a duty cycle to each second channel based on the corresponding largest number of third nodes.

18. The apparatus of claim 14, wherein the processor is to allocate different subsets of the second channels to the first node and the plurality of second nodes based on the corresponding channel activity reports received from the first node and the plurality of second nodes.

19. The apparatus of claim 18, wherein the processor is to allocate different duty cycles to the first node and the plurality of second nodes for transmission on each second channel in the different subsets of the second channels based on corresponding numbers of third nodes reported by the first node and the plurality of second nodes to be sharing each second channel.

20. The apparatus of claim 18, wherein the processor is to allocate the different subsets of the second channels based on information indicating locations of the first node and the plurality of second nodes.

* * * * *